United States Patent [19]

Iida et al.

[11] Patent Number: 5,042,844
[45] Date of Patent: Aug. 27, 1991

[54] HOSE FIXTURE DEVICE

[75] Inventors: Akira Iida, Hitachi; Akira Iwao, Kita ibaraki; Yoshitaro Ishii, Hitachi; Naruhiko Suzuki, Hitachi; Yasuyuki Hiruta, Hitachi, all of Japan

[73] Assignees: Hitachi, Ltd., Tokyo, Japan; Tagasangyo, Ltd., Hitachi, Japan

[21] Appl. No.: 458,294

[22] Filed: Dec. 28, 1989

[30] Foreign Application Priority Data

Dec. 29, 1988 [JP] Japan .................................. 63-331786

[51] Int. Cl.⁵ ............................................ F16L 35/00
[52] U.S. Cl. ......................................... 285/7; 285/93; 285/251; 285/319; 285/331; 285/391; 285/903; 285/921
[58] Field of Search ............... 285/331, 403, 903, 921, 285/93, 391, 319, 251, 423, 7, 303, 328; 403/27, 300, 305

[56] References Cited

U.S. PATENT DOCUMENTS

| | | | |
|---|---|---|---|
| 3,958,818 | 5/1976 | Mason | 285/331 X |
| 4,558,889 | 12/1985 | Gans . | |
| 4,582,350 | 4/1986 | Okajima | 285/391 X |
| 4,625,998 | 12/1986 | Draudt et al. | 285/903 X |
| 4,747,621 | 5/1988 | Gans et al. | 285/7 |
| 4,836,580 | 6/1989 | Farrell | 285/319 X |

FOREIGN PATENT DOCUMENTS

| | | |
|---|---|---|
| 3312193 | 4/1984 | Fed. Rep. of Germany . |
| 59-2753 | 12/1956 | Japan . |
| 1025096 | 4/1966 | United Kingdom ............... 385/7 |

OTHER PUBLICATIONS

Eureopean Search Report EP 89313604.4.

Primary Examiner—Dave W. Arola
Assistant Examiner—Heather Chun
Attorney, Agent, or Firm—Antonelli, Terry, Stout & Kraus

[57] ABSTRACT

A hose fixture device has a cylindrical wall with projections thereon, which projections engage a corresponding mounting projection of a hose. Normally that mounting projection is a helix, so that there is a screw engagement. The projections are arranged circumferentially around the cylindrical wall with gaps therebetween. There are also gripper members, again spaced circumferentially with gaps therebetween, which grip an end of the hose. The gaps make is easy to see such engagement. The gripper members are aligned with the gaps between those projections. This provides a secure fixing of the hose to the hose fixture device. Furthermore, the device may be moulded easily. Such a hose fixture device may be used to attache a hose joint component (e.g. a suction tool) to a hose of an electric vacuum cleaner.

16 Claims, 5 Drawing Sheets

HOSE FIXTURE DEVICE

BACKGROUND OF THE INVENTION

1. Field of the Invention

The present invention relates to a hose fixture device for attachment to a hose having a mounting projection thereon.

2. Summary of the Prior Art

It is well known to connect the body of a vacuum cleaner to a suction tool using a flexible hose. One known example of such a hose has a helical projection thereon, so that an appropriate suction tool can be mounted on the hose simply by providing a threaded fitting on the suction tool, and threading that fitting on to the helical projection of the hose. However, although such an arrangement makes it easy to mount the suction tool on the hose, it is also easy for the suction tool to become detached during use as the suction tool can rotate relative to the hose.

Therefore, attempts have been made to mount the suction tool in a way that permits it to rotate relative to the hose, but does not permit it to become detached. In Japanese utility model publication number 59-2753, there is the proposal of forming a shaped end to the hose, with a circumferential projection thereon. Then, a two-part locking ring is fitted around that shaped end, with the two-part locking ring having a groove on the inner surface thereof which engages the projection to permit relative rotation of the locking ring and the shaped end. Then, the suction tool is clipped to the locking ring.

In a further development, it has been proposed to provide a hose fixture device with a threaded surface which engages the helical projection on the hose. In order to prevent the hose fixture device from becoming unthreaded, it is securely fixed to the end of the hose with glue. Prior to mounting the hose fixture device on the hose, a retaining ring is fitted on the hose to be freely rotatable thereon. The hose fixture device prevents that retaining ring from sliding off the hose. Then, the suction tool is shaped so as to have a cylindrically projecting wall which extends around the hose fixture device and engages the retaining ring. The hose fixture device is held between parts of the suction tool and the retaining ring, but since it is not fixed thereto the suction tool is free to rotate relative to the hose retaining device, and hence relative to the hose itself.

SUMMARY OF THE INVENTION

A problem arises when a hose fixture device is fixedly mounted on the end of the hose since it is not uncommon for the hose to crack during use, and such cracking is most likely to occur immediately adjacent the hose fixture device, as bending at that point may cause kinks in the hose. However, if such a crack develops, it is difficult to repair the hose and a new hose fixture device will have to be provided and glued to an new end of the hose, which new end is being formed by cutting off the old end of the hose and the attached hose fixture device.

This problem is even more acute for the arrangement disclosed in Japanese utility model publication number 59-2753 referred to above, since it then becomes necessary to completely replace the hose if a crack develops therein, because the end of the hose has to be specially shaped.

Therefore, the present invention seeks to provide a hose fixture device which can be securely mounted on the hose, without the risk of becoming accidentally detached, but which may be detached if necessary.

At its simplest, the present invention proposes that a plurality of projections be formed on a wall of the hose fixture device for engaging the hose. Those projections are spaced apart in a circumferential direction so that there are gaps therebetween. The present invention may also provide gripping members on the walls for gripping an end of the hose. Again, those gripping members are spaced apart in a circumferential direction. This has the advantage that, when the hose fixture device is threaded onto the end of the hose, the user can see the end of the hose between the gripping members and can therefore determine when the hose fixture device is fully threaded onto the end of the hose.

The gripping members are preferably arranged so that they are circumferentially aligned with the circumferential gaps between the projections. In this way, a series of three-point fixings are provided between one gripping member and a pair of projections, or a pair of gripping members and one projection. The hose can deform in each three-point fixing, so that it is gripped securely thereby. However, it is also possible to remove the hose fixing device from the end of the hose by application of sufficient force to release the grip between this three-point fixing and the mounting projection of the hose.

The gripping action of the gripping members may further be improved by providing one or more ribs thereon. It has been found that, in some cases, the friction between a planar gripping member and the end of the hose is excessively high, so that it is difficult to unthread the hose fixture device from the hose. The use of one or more ribs facilitates gripping without causing excessive friction. Indeed, the presence of the one or more ribs assists further to deform the hose at the gripping member, thereby improving the three-point fixing of the hose between gripping member or members and the projections.

It should be noted that the circumferential gaps between the projections for engaging the mounting projection of the hose, and the gap between the gripping members simplifies the moulding of a hose fixture device according to the present invention. If either the projections or the gripping members extended completely around the cylindrical wall of the hose fixture device, a complicated moulding technique is needed to remove an inner part of the mould from the interior of the moulded hose fixture device. The gaps between the projections, and the gaps between the gripping members, means that the inner parts of the mould for forming the hose fixture device may be removed straightforwardly in axial directions. This simplification of moulding is further assisted by the off-set circumferential spacing of the projections and the gripping members respectively.

Normally, hoses are used in which the mounting member is in the form of a helical projection along the length of the hose. In this case, as described above, the hose fixture device according to the present invention is threaded onto the end of that hose, and the projections may then be positioned so that they form a broken helix. However, the present invention may also be applied to a hose in which the mounting projection of the hose is one of a plurality of circumferential projections, in which case the projection of the hose is one of a plurality of projections of the hose fixture device must deform when the end of the hose is pushed onto the hose fixture device. As described above, gripping members may also be provided on such a hose fixture device, to give the three-point gripping also described above.

A hose fixture device according to the present invention may be used to retain a retaining ring on the hose. Then, a suction tool is used which has a cylindrical projection which fits around the hose fixture device and engages the retaining ring. There is abutment between the retaining ring and the hose fixture device, and between the hose fixture device and the suction tool, but this abutment does not result in engagement, so that the suction tool is free to rotate relative to the hose fixture device, and hence relative to the hose itself.

In such a structure, if a crack develops in the hose it is easy to repair the vacuum cleaner. The suction tool is released from the retaining ring, and then the hose fixture device according to the present invention is unthreaded from the end of the hose. Then, the length of the hose containing a crack is cut off. It is subsequently a straightforward matter to fit the hose fixture device onto the cut end of the hose, and re-mount the suction tool on the end of the hose, by engagement with the retaining ring. As was mentioned above, the engagement of the hose with the hose fixture device of the present invention is releasable if sufficient force is applied without damaging the hose fixture device for the hose itself. As can be understood, this facility also permits the user of the vacuum cleaner to adjust the length of the hose to a shorter length than supplied by the manufacturer, if necessary.

There is a further feature of the present invention, involving the engagement of the hose fixture device with the suction tool. The hose fixture device has an annular projecting wall, which abuts against a corresponding cylindrical projection of the suction tool. Then, one or both of the annular projecting wall and the cylindrical projection are tapered. This ensures a good seal therebetween, because under the pressure exerted by the suction of the vacuum cleaner, one or both of the annular projecting wall and the cylindrical projection will deform slightly to conform to the other, thereby ensuring that leakage does not occur.

Furthermore, in order to prevent leakage, the hose fixture device according to the present invention may have a further cylindrical wall. Normally, a hose is used with the mounting projection being on an outer surface thereof. Then, the first cylindrical wall of the present invention, with the projections thereon, is located outwardly of the hose, with the projecting projection inwardly. Preferably, there is then an inner cylindrical wall which is positioned so that the hose fits between the outer and inner walls. If this fitting is a close fitting, leakage between the hose fixture device according to the present invention and the hose will further be reduced.

In the present specification, the term suction tool includes a wide range of devices which may be used with a vacuum cleaner, such as brushes, etc., and further includes an extension pipe. Such components are referred to generally as hose joint components. Such suction tools may be made interchangeable by suitable design of the engagement between the suction tool and the retaining ring, e.g. by engagement of a projection and a bore.

It should also be made clear that the present invention is not restricted to a hose fixture device for a hose for a vacuum cleaner, and may be used for attachment to other types of hoses.

BRIEF DESCRIPTION OF THE DRAWINGS

Embodiments of the present invention will now be described in detail, by way of example, with reference to the accompanying drawings, in which.

DETAILED DESCRIPTION

Referring to FIG. 1 to FIG. 6, a connection between a dust suctioning hose of an electric vacuum cleaner (hereinafter called a hose) and a suction tool, extension pipe or mounting to connect the hose to the vacuum cleaner body (hereinafter called a hose joint) is exchangably inserted into and removed from various kinds of nozzles e.g. for floor use, for rug use, for curtain use.

Figure 1:
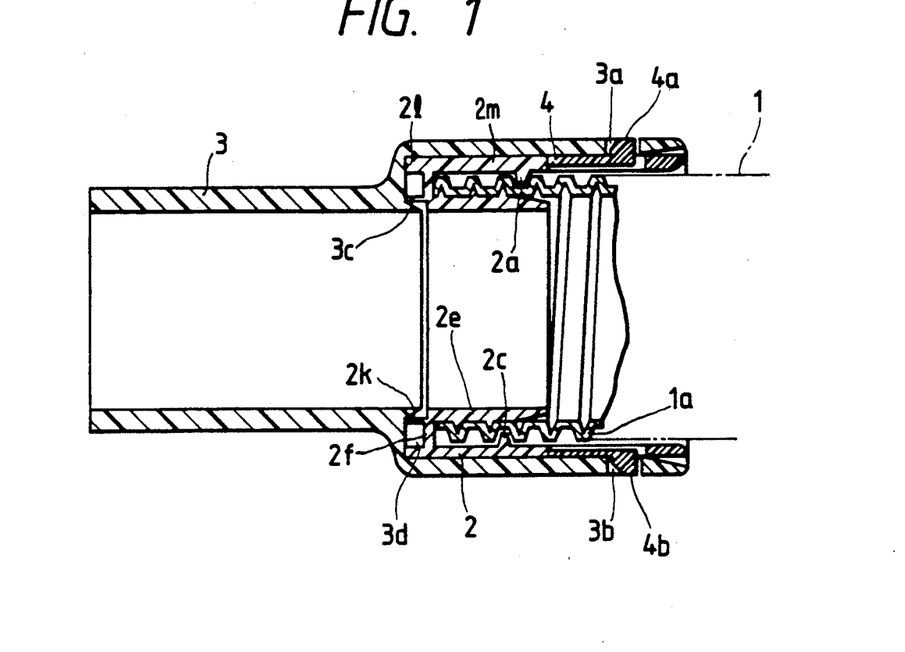
FIG. 1 is an axial cross-sectional view of a suction tool mounted on an end of a hose through a hose fixture device constructed in accordance with the present invention.

In this embodiment a cylindrical hose fixture device 2 is attached to a flexible hose 1. The hose 1 has an axially extending helical projection 1a which engages the hose fixture device 2 via four projections 2a, 2b, 2c and 2d which couple with the projections 1a of the hose 1. The assembly of the hose 1 and the hose fixture device 2 is inserted into a hose joint 3. The hose joint 3 has stopper bores 3a and 3b, and a retaining ring 4 has projections 4a and 4b so that the retaining ring 4 is attached to the hose joint 3 by engagement of the projections 4a and 4b with the stopper bores 3a and 3b. Before attaching the hose 1 to the hose fixture device 2, the retaining ring 4 is first loosely engaged with the hose 1. Then after inserting the hose fixture device 2 (with the hose 1 attached) into the hose joint 3, the retaining ring 4 is also inserted into the hose joint 3 to cause the projections 4a and 4b to engage the stopper bores 3a and 3b of the hose joint 3. With this arrangement, when a pulling force is applied to the hose 1, the hose fixture device 2 contacts the retaining ring 4 attached to the hose joint 3. Then the hose fixture device 2 acts as a stopper member of the hose 1 against the hose joint 3, and therefore easy removal is prevented. It can be seen that the connection of the hose 1 and hose joint 3 is not via bonding or threading but via a rotatable support due to the combination of the cylindrical hose fixture device 2 and the retaining ring 4. Therefore, during use, for example, during cleaning using the electric vacuum cleaner, even if a twisting force is applied to the hose 1, the connection between the hose 1 and the hose joint 3 rotates, so that no twisting of the hose 1 is caused.

Figure 2:
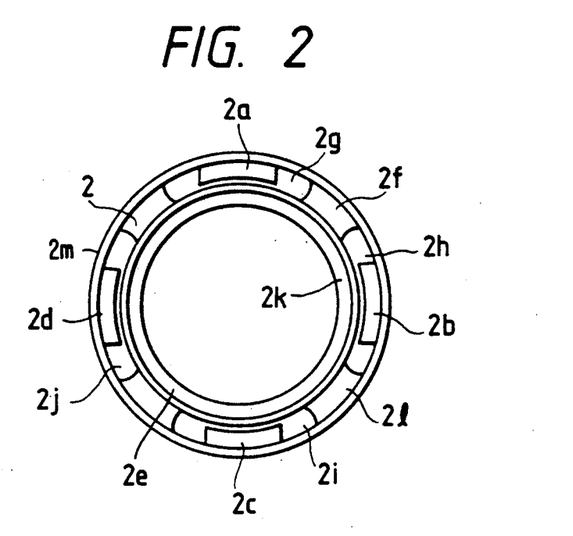
FIG. 2 is an axial end view of the hose fixture device of FIG. 1.
Figure 3:
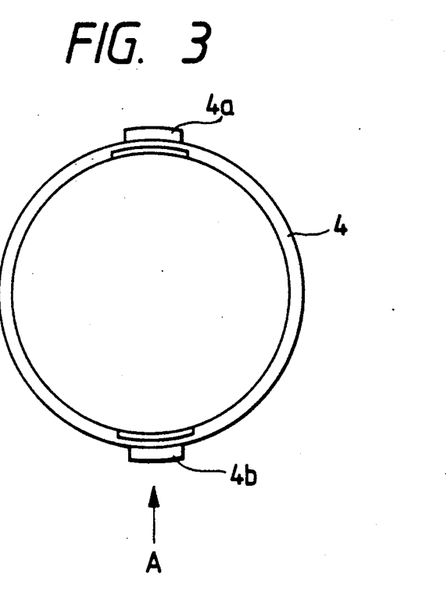
FIG. 3 is an end view of a retaining ring for use with a hose fixture device according to the present invention.
Figure 4:
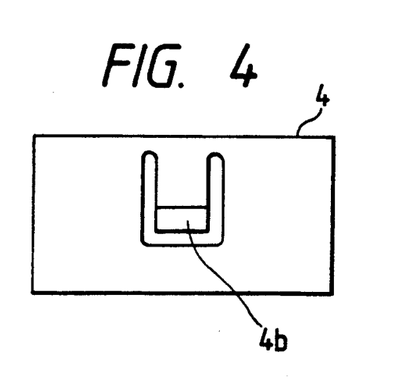
FIG. 4 is a detail view of the retaining ring taken in the direction of the arrow A in FIG. 3.
Figure 5:
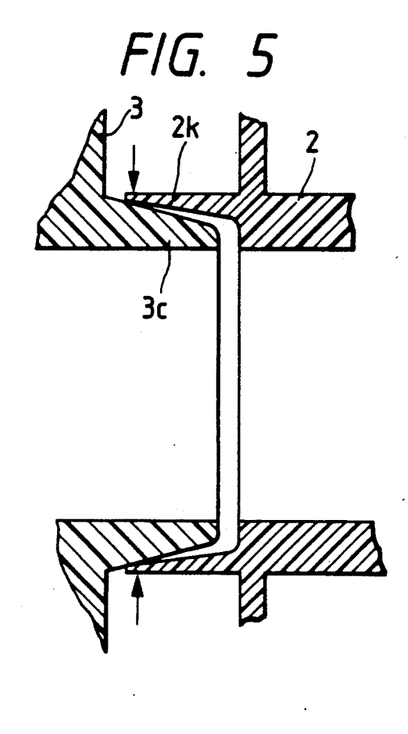
FIG. 5 is an enlarged cross-sectional detail view of an abutment of the hose fixture device and a suction tool constructed in accordance with the present invention.
Figure 6:
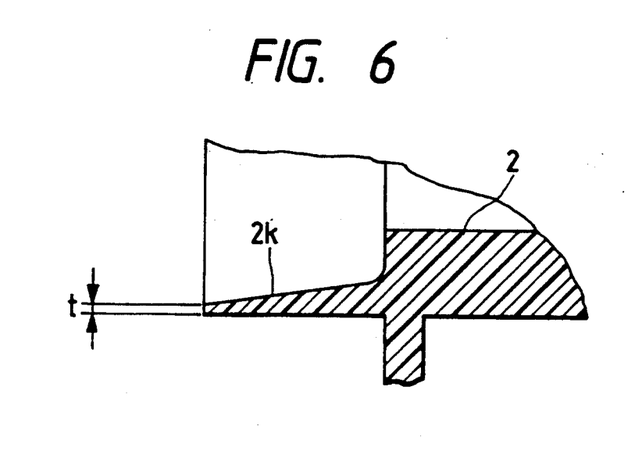
FIG. 6 is a cross-sectional detail view of the hose fixture device of FIG. 5.

The hose fixture device 2 is provided with a cylindrical outer ring $2m$ and a cylindrical inner wall of ring $2e$ disposed concentrically with respect to the outer ring $2m$. The inner ring or wall $2e$ is connected through four connecting members or walls $2f$ to the outer ring $2m$, with the connecting members or walls $2f$ contacting an end face of the hose 1 as shown most clearly in FIG. 1. The four connecting members or walls $2f$ are disposed symmetrically between the outer ring $2n$ and the inner ring $2e$. Gaps $2g$, $2h$, $2i$, $2j$ are formed between adjacent connecting members or walls $2f$, with the gaps being disposed in opposition to projections $2a$, $2b$, $2c$, $2d$ provided on the outer wall or ring $2m$. Each of the four projections $2a$, $2b$, $2c$, $2d$ forms a part of a screw thread and, as shown in FIG. 2, disposed respectively midway between two adjacent connecting members or walls $2f$.

Thus, as shown in FIG. 1, the walls or connecting members $2f$ engage the end of the hose 1. The cylindrical inner wall $2e$ prevents deflection of the hose 1. Therefore, when a pulling force is applied to the hose 1, and the hose 1 deflects due to the flexibility of the hose 1, release of the engagement between the projections $1a$ of the hose 1 and the projections $2a$, $2b$, $2c$ and $2d$ of the hose fixture device 2 is prevented. Hence, the interconnection of the hose 1 and the hose fixture device 2 is ensured. The inner cylindrical wall $2e$ of the hose fixture device 2 also helps to prevent a leakage at the fixing part between the hose fixture device 2 and the hose 1.

With the cylindrical wall $2e$ being integral with the outer ring $2m$ of the hose fixture device 2 via the wall $2f$, the advantages discussed above are obtained without increasing the number of parts in the assembly. Furthermore, the assembly operation is made easier due to the small number of parts. By inserting the hose end face sufficiently far into the hose fixture device 2 so that it engages the walls or connecting members $2f$ and, by noting that the end of the hose 1 touches part of the wall $2f$ (by looking axially at the end of the hose through gaps $2g$, $2h$, $2i$, $2j$), it can be detected that the hose 1 is engagably inserted fully into the hose fixture device 2. This eliminates defective attachment of the hose 1 to the hose fixture device 2. In addition, by providing gaps $2g$, $2h$, $2i$ and $2j$ between adjacent walls or connecting members $2f$, contact of the end of the hose 1 with the walls or connecting members $2f$ is visually ensured, so that it is easy to check that the engagement of the hose 1 and the hose fixture device 2 has occurred. The efficiency of such an inspection is thus enhanced. The gaps $2g$, $2h$, $2i$ and $2j$ are aligned with the projections $2a$, $2b$, $2c$ and $2d$ in the axial direction of the hose fixture device 2. Therefore the moulding of the hose fixture device 2 may be carried out by a metal die for mould use which is divided in the axial direction of the hose 1. This eliminates any need to divide the metal die and twisting thereof is eliminated, so that the production and processing of the hose fixture device 2 is enhanced as will be described in more detail hereinbelow.

According to the first embodiment, the hose fixture device 2 engages the spiral projection $1a$ provided on the hose 1 in the axial direction. Therefore even when it is necessary to cut the hose 1 to a different length, which may be necessary depending on the circumstances, it is easy to re-attach a renewed hose end to the hose fixture device 2 via the projections $1a$ provided on the hose 1. There are a number of cases where it is necessary to cut the hose into an arbitrary length. For example, it is usual for the manufacturer of a vacuum cleaner to produce a long hose. Then the purchaser of the vacuum cleaner may decide that a shorter length of the hose is needed depending on the conditions of use (such as a room size). Also during use of the vacuum cleaner, a crack may occur in part of the hose because of fatigue due to repeated bending. Then, instead of purchasing a new vacuum cleaner or at least a whole new hose, the old hose is used by cutting off the cracked part of the hose then reattaching the adapter to the renewed end of the hose top.

In this embodiment the hose joint 3 is provided with a taper shaped cylindrical projection $3c$ on a surface $2l$ opposite the hose fixture device 2 in the innermost part of the hose joint 3. An annular wall $2k$ which contacts and engages this cylindrical projection $3c$ is provided on the wall $2f$ of the hose fixture device 2 opposite the innermost surface $3d$ at the hose joint 3. The hose fixture device 2 is provided with a cylindrical projection $2k$ which contacts the innermost surface $3d$ of the hose joint 3. The entire circumferential end of the annular wall $2k$ contacts the tubular projection $3c$ formed on the hose joint 3, so that leakage at the point of attachment is prevented.

In this embodiment, the hose joint 3 is made of a hard ABS resin, the hose fixture device 2 is made of polypropylene which is flexible. Therefore, when the electric vacuum cleaner is operated and the inside of the hose attachment device (that is, the inside of the hose 1) is subject to a negative pressure, the annular wall $2k$ of the hose fixture device 2 deforms at its end portion so as to fasten to the cylindrical projection $3c$ of the hose joint 3. Hence a good sealing effect is obtained and thus the hose attachment device is satisfactory in preventing leakage. As can be seen from FIG. 6, the thickness t of the annular wall $2k$ of the hose fixture device 2 is preferably as thin as possible so that it can be deformed easily by the negative pressure inside the hose attachment device. The cylindrical projection $2l$ decreases the contacting area between the hose joint 3 and the hose fixture device 2 and reduces the friction of the hose fixture device 2 in the hose joint 3 during rotation thereof. Thus, the hose fixture device 2 freely rotates in the hose joint 3.

In this embodiment, the pitch of the projections $2a$, $2b$, $2c$ and $2d$ of the hose fixture device 2 is selected to be the same as that of the helical projection of the hose 1. Attachment of the hose 1 and the hose fixture device 2 is carried out by threading the end of the hose 1 into the hose fixture device 2. However, in this embodiment, as stated above, the hose fixture device 2 rotates in the hose joint 3. There is thus no loosening of the attachment between the hose 1 and the hose fixture device 2 due to twisting of the hose 1. Thus, disengagement of the hose fixing device 2 from the hose due to a defective bonding operation should not occur, as may happen if the hose fixture device 2 is bonded to the hose with a bonding agent (glue).

Figure 7:
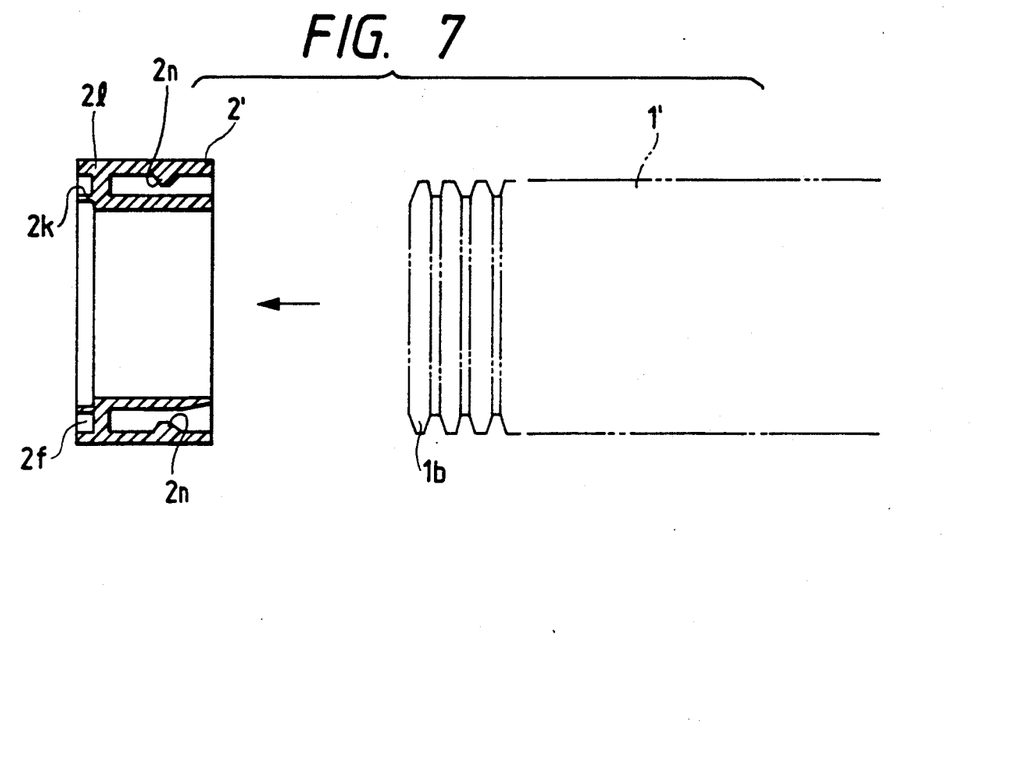
FIG. 7 is an exploded view of a hose fixture device in accordance with a second embodiment of the present invention.

In the first embodiment described above, the connection between the hose 1 and the hose fixture device 2 is by a threaded engagement of the helical projections 1a of the hose 1 with the projections 2a, 2b, 2c and 2d of the hose fixture device 2. However, instead of this, as shown in FIG. 7, a hose 1' may have many successive ring shaped projections 1b along the axial direction. A plurality of projections 2n, inclined in the direction of insertion of the hose 1' may be provided on the hose fixture device 2' as also shown in FIG. 7. Then when the hose 1' is inserted into the hose fixture device 2', the plurality of the projections 2n provided on the hose fixture device 2' deform elastically and do not prevent the insertion of the hose 1'. On the other hand, when the hose 1 is pulled out of the hose fixture device 2', the plurality of projections 2n recover their elasticity and hold the hose 1' to prevent removal of the hose 1'. With the arrangement of FIG. 7, the projections 2n grip the projections 1b with elastic deformation of the hose 1' so as to prevent free rotation of the hose 1' and the hose fixture device, forced rotation of the hose 1' and hose fixture device 2' above a predetermined loading releasing the grip without damage to the hose 1' or the hose fixture device 2', whereby the hose fixture device 2' is disengagable from the hose 1'.

Figure 8:
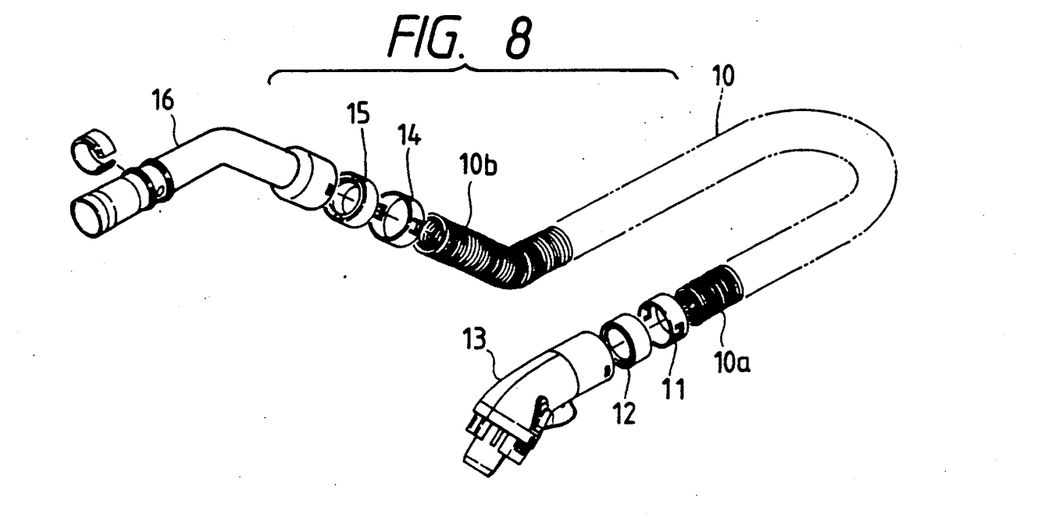
FIG. 8 is an exploded view of a hose and attached components for connection to an electric vacuum cleaner.

FIG. 8 shows hose fixture devices according to the present invention used in connection with a vacuum cleaner. A hose 10 has a first retaining ring 11 fitted thereon, and then a first hose fixture device 12 according to the present invention is engaged with the end 10a of the hose 10. A component 13 for connecting the hose 10 to the body of a vacuum cleaner (not shown) is then positioned over the hose fixture device 12, to engage with the retaining ring 11. The connection of the retaining ring 11, hose fixture device 12, and component 13 corresponds to the linking of parts hose fixture device 2, hose joint 3, and retaining ring 4 in first embodiment of the present invention described above. Then, a second retaining ring 14 is fitted on the other end 10b of the hose 10, and another hose fixture device 15 according to the present invention is mounted on the end of the hose 10. That then permits an extension pipe 16 to be connected to the retaining ring 14 in the same way as for hose fixture device 2, hose joint 3, and retaining ring 4 discussed above. Thus, the hose 10 is free to rotate at its connection to the component 13, and the extension pipe 16 is free to rotate relative to the end 10b of the hose 10, so that twisting of the hose will not occur.

Figure 9:
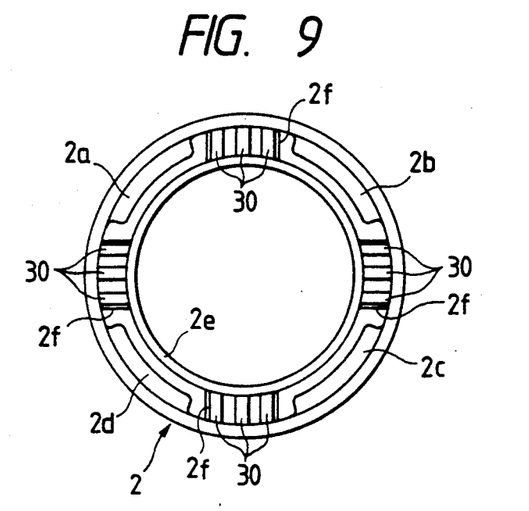
FIG. 9 is an axial end view of a hose fixture device constructed in accordance with the present invention.
Figure 10:
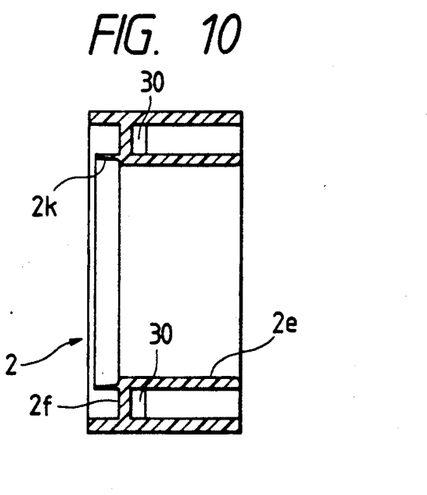
FIG. 10 is a cross-sectional view of the hose fixture device of FIG. 9.
Figure 11:
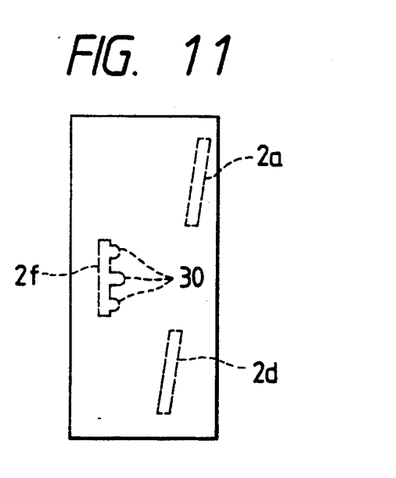
FIG. 11 is a side view of the hose fixture device of FIG. 9.

The third embodiment of FIGS. 9-11 corresponds generally to the first embodiment shown in FIG. 1, and the same reference numerals are used to indicate corresponding parts. However, in the embodiment of FIGS. 9-11, ribs or projections 30 are provided on the walls or connecting members 2f. These ribs or projections 30 improve the gripping of the end of the hose. It has been found that if the hose fixture device according to the first embodiment of the present invention is tightly threaded onto the end of the hose 1, the friction between the walls or connecting members 2f and the end of the hose 1 may be so great that it is difficult subsequently to unthread the hose fixture device 2. The provision of the ribs or projections 30 controls the friction between the end of the hose 10 and the walls or connecting members 2f. Furthermore, as shown in FIG. 11, the middle one of the three ribs 30 may project slightly further from the walls or connecting members 2f than the other two. This has been found to improve the three-point gripping of the hose 10 between the walls or connecting members 2f and the adjacent projections 2a, 2b, 2c, 2d.

Figure 12:
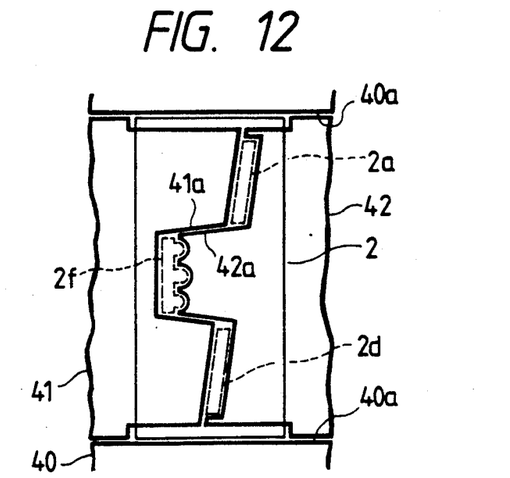
FIG. 12 is a schematic view of a molding arrangement for the hose fixture device of FIG. 9.

As was mentioned earlier, a hose fixture device according to the present invention may be formed by moulding. This is shown in FIG. 12 in which the orientation of the hose fixture device 2 corresponds to that shown in FIG. 11. As illustrated, the mould has three mould parts, namely, is an outer mould part 40 with a cylindrical bore into which fit in opposite axial directions two inner mould parts 41, 42. The inner surfaces 40a, 41a, 42a of the mould parts 40, 41 and 42 are shaped so as to define a gap therebetween, which gap will correspond to the hose fixing device 2. Small gaps are shown between other surfaces of the mould parts 40, 41 and 42 in FIG. 12; however, the illustrated small gaps are for the sake of clarity and normally such gaps would not be provided. Then, the space between the mould parts 40, 41 and 42 is charged with moulding material, e.g. a thermosetting or thermoplastics material. This material conforms to the shape of the mould parts 40, 41 and 42 and thus to the shape of the hose fixture device 2, and setting of that material forms the hose fixture device 2.

It can be seen in FIG. 12 that it is then a simple matter to remove the inner mould parts 41, 42 in opposite axial directions, and then the hose fixture device 2 is releasable. The alignment of walls or connecting members 2f with the gaps between projections 2a, 2b, 2c and 2d means that the part of e.g. the mould part 42 which is to form a surface of the walls or connecting members 2f is readily removable from the hose fixture device 2, without that removal being affected by the projections 2a, 2b, 2c and 2d.

Figure 13A:
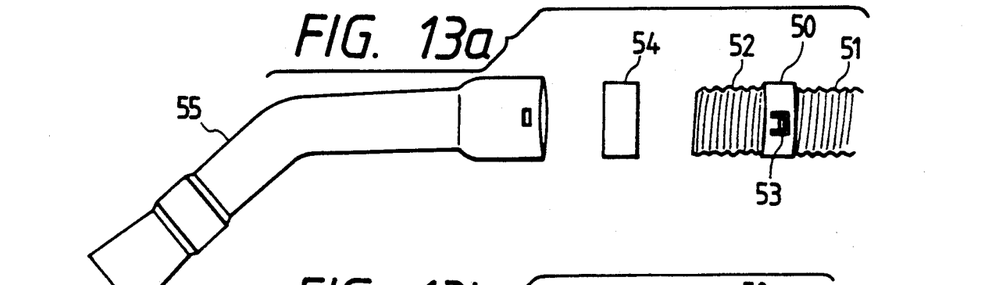
FIGS. 13a–13d are schematic views respectively depicting stages in a mounting of a suction tool on a hose using a hose fixture device constructed in accordance with the present invention.
Figure 13B:
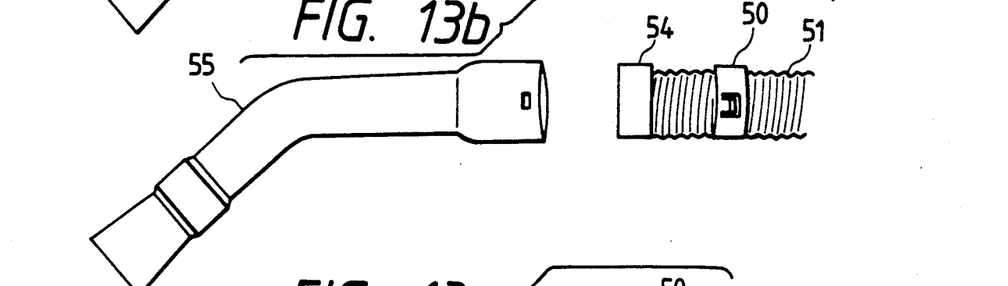
Figure 13C:
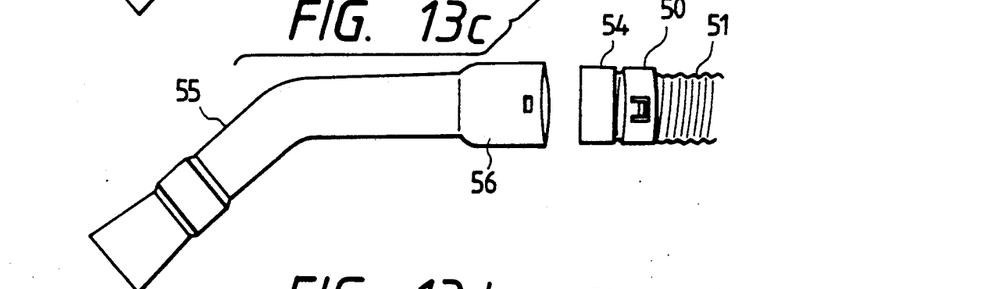

Finally, FIGS. 13a to 13d show in more detail the mounting of a suction tool on to a hose. This is the process that has already been described with reference to FIG. 1, and also with reference to FIG. 8. Thus, as shown in FIG. 13a, the retaining ring 50 is slipped over an end of the hose 51 and slid down that hose 51 to be clear of the end 52. As shown, there are two mounting lugs 53 on the retaining ring 50, which mounting lug 53 correspond to the projection 4a and 4b in FIG. 1. FIG. 13a also shows a hose retaining device 54 according to the present invention and a suction tool 55, which at this stage are separated. The next step, as shown in FIG. 13b, is the engagement of the hose fixture device 54 with the end 52 of the hose 51. Such engagement may be by a threaded-fitting as described with reference to the first embodiments, or by a clip fitting as described with reference to the second embodiment, depending on the nature of the hose. The engagement of the hose fixture device 54 onto the hose 51 retains the retaining ring 50 which may then be slid to a position adjacent or abutting the hose fixture device 54 as shown in FIG. 13c.

Figure 13D:
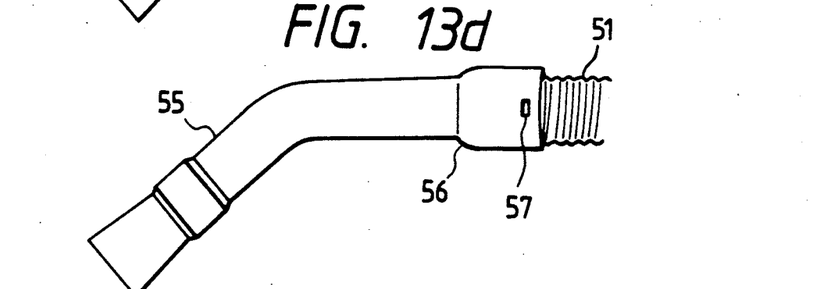

The suction tool 55 has an end part 56 which has a cylindrical wall which fits over the hose fixture device 54, so that the arrangement shown in FIG. 13d is formed. Two bores 57 in the end 56 of the tool 55 engage with the mounting lugs 53, thereby securing together the suction tool 55 and the retaining ring 50.

Although described above with reference to connection to a hose of a vacuum cleaner, the present invention is not limited thereto and may be used whenever it is necessary to connect to an end of a hose.

With the present invention a hose fixture device may be provided which prevents twisting of the hose, for example, during use with an electric vacuum cleaner due to independent rotation of the hose and the hose joint respectively. This ensures that the hose does not come out and has advantages with respect to processing, strength and assembling. Moreover when the user needs to cut the hose to a different length, the renewed hose end may be reattached easily to the hose joint, so that handling is enhanced. In addition leakage of suctioned air may be prevented.

What is claimed is:

1. A hose fixture device for attachment to a hose having a mounting projection thereon, the hose fixture device comprising:
   a first cylindrical wall portion and a second cylindrical wall portion;
   a plurality of projections on said first cylindrical wall portion for engaging said mounting projection on said hose to thereby engage said hose to said hose fixture device, said projection projecting from said first cylindrical wall portion in a radial direction and being spaced apart in a circumferential direction of said first cylindrical wall portion such that there is a circumferential gap between adjacent projections in the circumferential direction; and
   a plurality of gripping members provided on said second cylindrical wall portion for engaging an end of said hose, said gripping members projecting from said second cylindrical wall portion in a radial direction and being integral with said first cylindrical wall portion and being spaced apart in the circumferential direction so that there is a gap between adjacent gripping members in the circumferential direction.

2. A hose fixture device according to claim 1, wherein said gripping members are circumferentially aligned with said circumferential gaps between said adjacent projections, and said projections and said gripping members are axially spaced from each other.

3. A hose fixture device according to claim 1, wherein said gripping members have at least one rib thereon, said at least one rib extending axially of the corresponding gripping member for engagement of an end with said hose when said hose fixture device is engaged with said hose.

4. A hose fixture device according to claim 1, said first cylindrical wall portion and said second cylindrical wall portion are radially spaced from each other so as to define therebetween a space for receiving said hose.

5. A hose fixture device according to claim 1, wherein said mounting projection of said hose forms a helix, and said projections form a discontinuous helix.

6. A hose fixture device for attachment to a hose having a mounting projection thereon, the fixture device comprising:
   a first cylindrical wall having means thereon to engage said mounting projection on said hose to attach the hose to the hose fixture device; and
   a plurality of gripping members on a second wall for engaging an end of said hose, said gripping members projecting from said wall in a radial direction and being spaced apart in the circumferential direction such that there is a gap between adjacent ones of said gripping members in the circumferential direction;
   whereby said hose fixture device is engageable with said hose with said gripping members engaging an end of said hose, parts of said end of said hose being visible in the axial direction due to said circumferential gaps between said gripping members.

7. A hose fixture device according to claim 6, wherein said gripping members have at least one rib thereon extending axially of said gripping member for engagement of an end of said hose when said hose fixture device is engaged with said hose.

8. A hose fixture device for attachment to a hose having a mounting projection thereon, the fixture device comprising:
   a first cylindrical wall having means thereon to engage said mounting projection on said hose to attach the hose to the hose fixture device; and
   a plurality of gripping members on a second wall for engaging an end of said hose, said gripping members projecting from said wall in a radial direction and being spaced apart in the circumferential direction such that there is a gap between adjacent ones of said gripping members in the circumferential direction;
   wherein said gripping members have at least one rib thereon, said at least one rib extending axially of said gripping member for engagement of an end of said hose when said hose fixture device is engaged with said hose.

9. A hose end assembly for attachment to a hose having a mounting projection thereon the hose end assembly comprising:
   a hose fixture device having a first cylindrical wall portion;
   a plurality of projections on said first cylindrical wall portion for engaging said mounting projection on said hose to thereby engage said hose to said hose fixture device, said projections projecting from said first cylindrical wall portion in a radial direction and being spaced apart in the circumferential direction of said first cylindrical wall portion so that there is a circumferential gap between adjacent projections in the circumferential direction;
   a retainer abutting a first part of said hose fixture device; and
   a hose joint component abutting a second part of said hose fixture device, said hose joint component and said retainer being engaged together such that said hose fixture device is rotatably retained between said hose joint component and said retainer.

10. A hose end assembly according to claim 9, wherein said hose joint component includes a cylindrical wall extending around said hose fixture device, said hose joint component and said retainer having at least one interlocking engagement projection and bore for engagement of said hose joint component and said retainer.

11. A hose end assembly according to claim 9, wherein said hose fixture device includes a second cylindrical wall portion having a plurality of gripping members thereon for engaging an end of said hose, said gripping members projecting from said second cylindrical wall portion in a radial direction and being spaced apart in the circumferential direction so that there is a gap between adjacent gripping members in the circumferential direction, and wherein said gripping members are circumferentially aligned with said circumferential gaps between said adjacent projections, and said projections and said gripping members are axially spaced from each other.

12. A hose end assembly according to claim 9, wherein said first part of said hose fixture device is an annular projecting wall, said hose joint component has a cylindrical projection engaging said annular projecting wall of said hose fixture device, and at least one of said cylindrical projections of said hose joint component and said annular projecting wall of said hose fixture device is axially tapered.

13. A hose end assembly for attachment to a hose having a mounting projection thereon, comprising:

- a hose fixture device having a cylindrical wall, and a plurality of gripping members on said wall for engaging an end of said hose, said gripping members projecting from said wall in a radial direction and being spaced apart in the circumferential direction such that there is a gap between adjacent ones of said gripping members in the circumferential directions;
- a retainer abutting a first part of said hose fixture device; and
- a hose joint component abutting a second part of said hose fixture device, said hose joint component and said retainer being engaged together so that said hose fixture device is rotatably retained between said hose joint component and said retainer.

14. A hose end assembly for attachment to a hose having a mounting projection thereon, comprising:

- a hose fixture device having a cylindrical wall having mounting means thereon to engage said mounting projection on said hose to attach the hose to the hose fixture, and a plurality of gripping members on said wall for engaging an end of said hose, said gripping members projecting from said wall in a radial direction and being spaced apart in the circumferential direction such that there is a gap between adjacent ones of said gripping members in the circumferential direction;
- wherein said gripping members have at least one rib thereon, said at least one rib extending axially of said gripping member for engagement of an end of said hose when said hose fixture device is engaged with said hose;
- a retainer abutting a first part of said hose fixture device; and
- a hose joint component abutting a second part of said hose fixture device, said hose joint component and said retainer being engaged together such that said hose fixture device is rotatably retained between said hose joint component and said retainer.

15. A hose end assembly for attachment to a hose having a mounting projection thereon, comprising:

- a hose fixture device having a cylindrical wall, means for engaging said mounting projection of said hose to engage said hose fixture device to said hose, an abutment surface, and an annular projecting wall;
- a retainer abutting said abutment surface of said hose fixture device; and
- a hose joint component having a cylindrical projection engaging said annular projecting wall of said hose fixture device, at least one of said cylindrical projection of said hose joint component and said annular projecting wall of said hose fixture device being axially tapered;
- wherein said hose joint component and said retainer are engaged together such that said hose fixture device is rotatably retained between said hose joint component and said retainer.

16. A hose fixture device for attachment to a hose having a mounting projection thereon, the hose fixture device comprising:

- a first cylindrical wall having mounting means thereon to engage said mounting projection on said hose to attach the hose to the hose fixture; and
- a plurality of hose engagement means on second wall for engaging said mounting projection on said hose, thereby to engage said hose to said hose fixture device;
- wherein said hose engagement means is arranged to grip said mounting projection between said hose engagement means with elastic deformation of said hose between said hose engagement means so as to prevent free rotation of said hose and said hose fixture device, forced rotation of said hose and said hose fixture device above a predetermined loading releasing said grip without damage to said hose or said hose fixture device, whereby said hose fixture device is disengagable from said hose.

* * * * *